United States Patent
Hart et al.

(10) Patent No.: US 6,877,016 B1
(45) Date of Patent: Apr. 5, 2005

(54) METHOD OF CAPTURING A PHYSICALLY CONSISTENT MIRRORED SNAPSHOT OF AN ONLINE DATABASE

(75) Inventors: Donald Ralph Hart, Irvine, CA (US); Kung Yi Lin, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 467 days.

(21) Appl. No.: 09/951,996

(22) Filed: Sep. 13, 2001

(51) Int. Cl.[7] .......................... G06F 12/00; G06F 17/30
(52) U.S. Cl. ...................................... 707/201; 707/204
(58) Field of Search .......................... 707/10, 201, 202, 707/203, 204, 8; 711/162

(56) References Cited

U.S. PATENT DOCUMENTS

| | | | | |
|---|---|---|---|---|
| 5,404,508 A | * | 4/1995 | Konrad et al. | 707/202 |
| 5,758,150 A | * | 5/1998 | Bell et al. | 707/10 |
| 5,794,252 A | * | 8/1998 | Bailey et al. | 707/202 |
| 5,835,953 A | * | 11/1998 | Ohran | 711/162 |
| 5,937,413 A | * | 8/1999 | Hyun et al. | 707/201 |
| 5,996,054 A | * | 11/1999 | Ledain et al. | 711/203 |
| 6,044,444 A | | 3/2000 | Ofek | |
| 6,122,630 A | * | 9/2000 | Strickler et al. | 707/8 |
| 6,128,627 A | * | 10/2000 | Mattis et al. | 707/202 |
| 6,182,198 B1 | * | 1/2001 | Hubis et al. | 711/162 |
| 6,289,356 B1 | * | 9/2001 | Hitz et al. | 707/201 |
| 6,393,540 B1 | * | 5/2002 | Blumenau et al. | 711/165 |
| 6,397,293 B2 | * | 5/2002 | Shrader et al. | 711/114 |
| 6,615,223 B1 | * | 9/2003 | Shih et al. | 707/201 |
| 6,654,830 B1 | * | 11/2003 | Taylor et al. | 710/74 |
| 6,748,504 B2 | * | 6/2004 | Sawdon et al. | 711/162 |
| 2001/0056438 A1 | * | 12/2001 | Ito | 707/204 |
| 2003/0051109 A1 | * | 3/2003 | Cochran | 711/162 |

OTHER PUBLICATIONS

Robert H.B. Netzer and Jian Xu (1995, Necessary and Sufficient Conditions for Consistent Global Snapshots, pp. 165–169.*
Jean–Michel Helary, Achour Mosterfaoui, and Michel Raynal (1999), Communication–Induced Determination of Consistent Snapshots, pp. 865–877.*

* cited by examiner

*Primary Examiner*—Safet Metjahic
*Assistant Examiner*—Merilyn Nguyen
(74) *Attorney, Agent, or Firm*—Alfred W. Kozak; Mark T. Starr; Lise A. Rode

(57) ABSTRACT

An on-line primary database is momentarily QUIESCED to enable a physically consistent snapshot of the primary database to be mirrored to a secondary database as a backup while allowing the primary database to continue on servicing multiple user applications.

3 Claims, 5 Drawing Sheets

METHOD OF CAPTURING A PHYSICALLY CONSISTENT MIRRORED SNAPSHOT OF AN ONLINE DATABASE

CROSS-REFERENCES TO RELATED APPLICATIONS

This application is related to applications, U.S. Ser. No. 09/415,273, which issued as U.S. Pat. No. 6,430,577, entitled "System And Method For Asynchronously Receiving Multiple Packets of Audit Data From a Source Data-based Host In a Resynchronization Mode And Asynchronously Writing The Data To a Target Host"; and also, U.S. Ser. No. 09/415,333, which issued as U.S. Pat. No. 6,446, 090, entitled "Tracker Sensing Method For Regulating Synchronization of Audit Files Between Primary and Secondary Hosts"; and U.S. Ser. No. 09/415,274, which issued as U.S. Pat. No. 6,408,310, entitled "system and Method For Expediting Transfer of Sectioned Audit Files From a Primary Host to a Secondary Host", each of which are incorporated herein by reference.

BACKGROUND OF THE INVENTION

The process of taking a database system "off-line" is counter-productive to the goal of maintaining the database availability for 24 hours a day, 7 days a week and 365 days a year. Currently, with the present types of database systems, a database system must be taken off-line to create a physically consistent snapshot for the purpose of offloading database processing in a mirrored disk environment. The present invention provides for the capability of creating a "physically consistent snapshots" while the database system still remains on-line.

Users of data processing systems who are required to maintain large volumes of data must make provisions to ensure that backup data is available in case of some disaster or power shutdown. For example, banks, insurance companies, stock market traders, financial institutions, who require large databases would be put into a difficult position should a failure occur which would render the database unavailable.

Thus, data processing system users will be seen to arrange to maintain copies of their valuable data on the same site or on some other storage media, or as in the present situation, make use of a secondary "mirrored" storage device which is located in communication with the main storage device. Thus, should some problem or disaster occur, then both the primary storage of data, as well as the secondary or backed-up data storage (which would ordinarily be unavailable to the host), could later be made available through the remote storage of the backup data.

One problem that occurs in prior art data storage systems, is where they use a method of data mirroring, wherein one host CPU or processor writes data to both the primary storage device, as well as a secondary data storage device. However, this leads to problems because this overly burdens the host CPU with the task of writing data not only to the primary data storage system, but to the secondary data storage system, and therefore can reduce system performance.

In the present invention, there is indicated a method of creating a physically consistent database from an on-line database system for the purpose of capturing a physically consistent mirrored snapshot of the database. A logically consistent database is maintained for an on-line database system by reading data from physical disk storage and temporarily storing the data in active memory storage. The data stored however, in memory, can undergo many changes that are activated by on-line database applications. These changes result in a database that is "not physically consistent" while the database system remains on-line. Thus, it can be understood that—the only method of securing a physically consistent database is to take the database system off-line. Physical consistency of a database is most desirable in a mirrored-disk environment, whereby mirrored copies can be split from their original source. The mirrored copies represent point-in-time snapshots of a physically consistent database. These snapshots can be used to off-load processing from the "original" database system thereby improving performance of the original system. Thus, by creating a physically consistent database from an online database system, there would be no need to take the primary system off-line, whereby there would be an increased database availability.

The present invention relates to the method of creating an external physically consistent database from an on-line database system. An on-line database system maintains a logically consistent database by (i) reading data from disk storage into a system memory storage, then (ii) making changes to data by updating system memory storage, and then (iii) writing the changed data to disk storage at periodic intervals. When there are no active users of a database system, all the modified or changed data is written from the system memory storage to the disk storage, and then the system can be taken off-line with the database in a physically consistent state. However, with the advent of physically mirrored disk storage, the database system process of off-loading of a physically consistent copy is enabled and the performance can be improved, whereby the primary system remains available for normal operations and the secondary system is available for backup operations.

As previously noted, the process of taking a normal database system off-line is counter-productive to the goal of maintaining 24 hour, 7 day a week, 365 days a year of database availability. Thus, if a physically consistent database could be created from an on-line database system, the database availability will still be maintained while the system performance is improved when a physically mirrored snapshot is used to off-load the processing.

An example of such a remote mirroring system is illustrated in U.S. Pat. No. 6,044,444 to Yuval Ofek of the EMC Corporation. This involves a data processing system which automatically and asynchronously, with respect to a first host system, generates and maintains a backup or "mirrored" copy of a primary storage device at a different location physically remote from the primary storage device. This is done without any intervention from the primary host which might seriously degrade the performance of the data transfer link between the primary host computer and its primary storage device.

U.S. Pat. No. 6,044,444, provides a method of mirroring physical storage in order to create a duplicate copy, described as a "physically mirrored snapshot". However, this U.S. patent to Ofek of EMC Corporation does not teach or show any method that provides physical consistency in the duplicate copy.

SUMMARY OF THE INVENTION

The object of this invention is to realize an increase in database system availability by the creating of a physically consistent mirrored snapshot of an on-line database.

In order to accomplish this objective, a database system process is provided and referred to as "QUIESCE" and according to the presently-described system, this consists of a database utility command that communicates a "QUIESCE" request to an on-line database.

When the QUIESCE command is issued, the following results are seen to occur in sequence: (a) a special utility program that issues the QUIESCE command waits until all active database transactions are complete, then (b) all applications in a transaction state will complete their current transactions, then (c) any application attempting to enter the transaction state is suspended with a specific message denoted "DATABASE IS QUIESCED—WAITING TO RESUME". Then, (d) all data and audit buffers are flushed to the disk during the creation of two specialized audited control points. Then (e) the database control file is marked as being in a QUIESCED state, and (f) the time-stamp at the time of the QUIESCE is stored in a database control file. Then (g) the utility program, that issued the QUIESCE command, completes with a message stating "DATABASE QUIESCED". Here, then (h) the database remains in a QUIESCED state, allowing Read access by users of the database until the utility program issues a RESUME command, after which all normal Write and Read operations can be operational.

Meanwhile during the QUIESCE period, a mirrored copy of the physically consistent database can be split-off from its source copy in order to off-load database activities for accomplishment, such as backup, certification, and data warehousing. Furthermore, database availability is now increased as the primary database system remains on-line throughout the entire process.

GLOSSARY OF RELEVANT ITEMS

Figure 1:
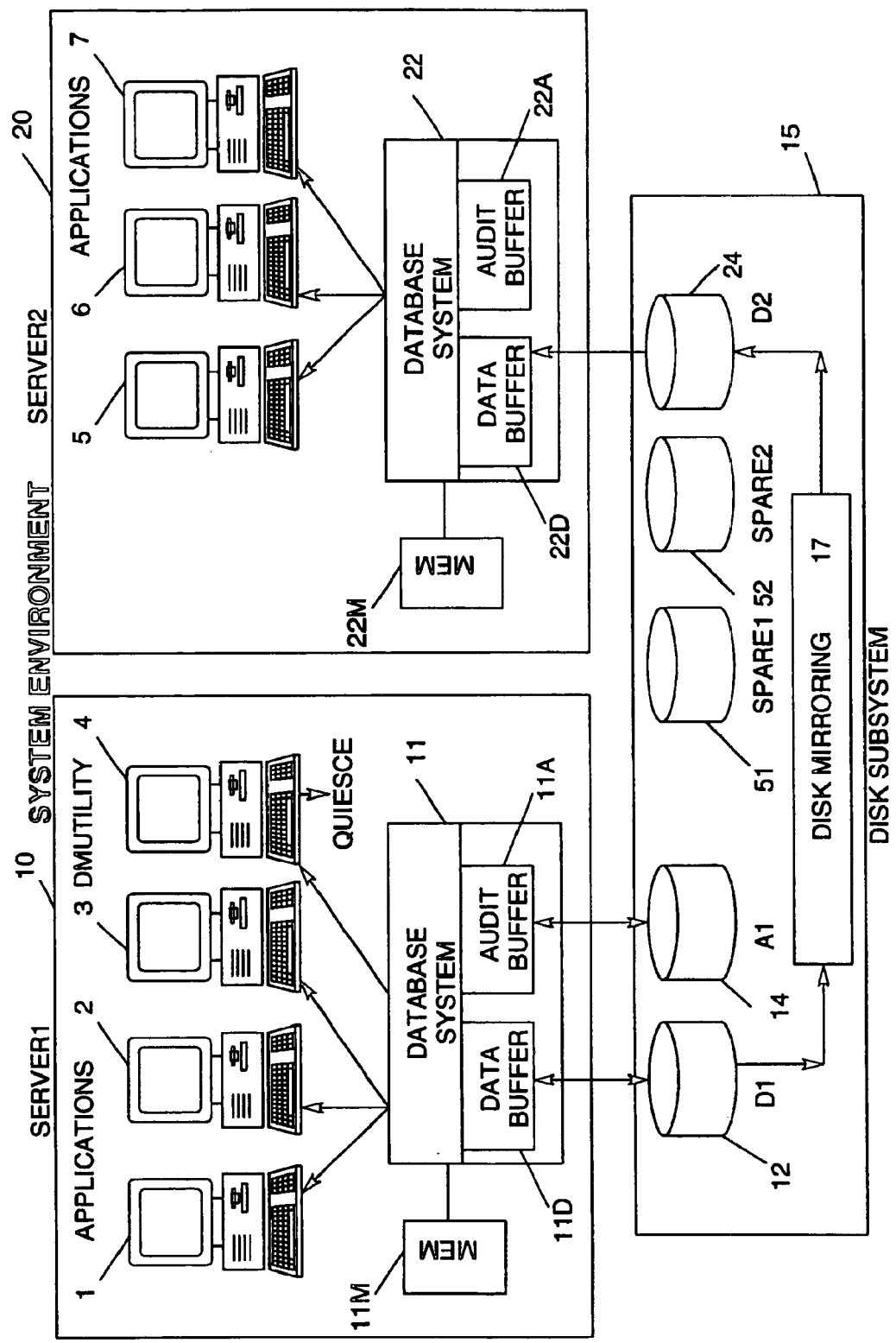
FIG. 1 is a drawing of the operating system environment showing a first and second server connected to a disk subsystem.

1. ACCESSROUTINES: The software component of DMSII product that is primarily responsible for the accessing (creating, modifying and deleting) of data in a DMSII database. The Accessroutines is also responsible for auditing all changes to the database.
2. ACR: See Accessroutines.
3. ACTIVE TRANSACTIONS COMPLETED: See QUIET POINT.
4. ADMINISTRATIVE OPTIONS: In an RDB system, user-interface options that initiate administrative tasks.
5. APPLICATION DEVELOPMENT: The activity of writing and testing database applications.
6. APPLICATION TRANSACTION STATE: The condition every update program of an audited database must enter in order to perform any data record update statements (e.g., STORE, DELETE, etc.).
7. AUDIT BLOCK: A structured package containing potentially many Audit Records (in the extreme situation, it is also possible that a single Audit Block could contain a partial Audit Record). There are a number of control words at the beginning and end of each Audit Block. Classically, the maximum size of an audit block is specified in the DASDL (Data And Structure Development Language) for each individual database; with the Extended Edition, it is possible for the ACR to extend this size dynamically. The size of an audit block is "rounded up" to fit into an integral number of disk sectors; it could occupy as few as 1 sector or (in the extreme) as many sectors as are in a disk row (specified in the DASDL via AreaSize).
8. AUDIT BUFFER: A system memory buffer maintained by the DMSII software into which an audit block is placed for ACCESSROUTINES access.
9. AUDIT FILE: Logically considered to be the sequential storage of Audit Records. Actually, the sequential storage of Audit Blocks which contain the Audit Records.
10. AUDIT RECORD: A structured package of data built somewhere within the ACR (Access Routine) and stored (sequentially) into the Audit File. Header and trailer words of the record contain, among other things, the length and type of record.
11. AUDIT SECTION: with the Extended Edition, multiple MCP (Master Control Program) disk files can be used to physically implement a single Audit File. Each of these disk files is referred to as a Section of the Audit File. The sequence of Audit Blocks is spread, round robin fashion, among the multiple Audit Sections.
12. AUDIT TRAIL: The sequence of Audit Files that are created that span the life of the database. Each Audit File is assigned an Audit File Number (AFN) starting at 1 when the database is created and incremented by one when each new Audit File is created. An Audit File may be Sectioned or not. The individual Sections of an Audit File all share the same AFN (Audit File Number) value, although they each have a unique section number within their Audit File.
13. AUDIT TRANSFER: In an RDB (Remote Data Base) system, a method of transmitting audit images from the source host to the target host.
14. AUDITED CONTROL POINTS: See CONTROL POINTS.
15. BACKUP: A copy of the primary database files stored on magnetic tape or disk storage.
16. BCV: An acronym for Business Continuation Volume. EMC provides the ability to create a duplicate of a disk which can then be processed independently of the original disk. The duplicate is called a Business Continuation Volume (BCV). A BCV contains a mirror image of an active production volume. The BCV can be separated from the production volume, allowing separate tasks to operate on independent data images.
17. BI: Business Initiative.
18. BNA NETWORK: The network architecture used on Unisys ClearPath Enterprise Servers to connect multiple, independent, compatible computer systems into a network for distributed processing and resource sharing.
19. CERTIFICATION: The process of verifying the physical consistency of a database or portion of a database.
20. CONFIGURATION OPTIONS: In an RDB (Remote Database Backup) system, user-interface options that initiate configuration tasks.
21. CONTROL POINT: A logical construct within the Unisys e-@ction Enterprise Database Server used to limit the number of audit records which must be reprocessed in the event of a system failure. Data buffers which have been modified are guaranteed to be written to disk at least once every two control points, thus halt/load recovery need only process changes since the second to last control point (FIG. 4) in an audit trail. Control Points occur on a user-specified frequency defined in SYNC points (See Glossary #83).
22. CSC: Customer Support Center. The Unisys organization tasked with answering customer questions and problem resolution. CSC is the first line of support for customers after consultation with any on-site representatives.
23. DASDL: Data And Structure Definition Language. The language used to specify the structure and specific software configuration for a database.
24. DATABASE ANALYSIS: The process of analyzing the physical structure of database files.
25. DATABASE AVAILABILITY: The availability of data files within a database system.
26. DATABASE CONTROL FILE: A special file required by the DMSII software on all databases. System-level information is stored in the Control File (FIG. 3) which the ACCESSROUTINES use to manage the database. The Control File also provides a place for exclusive users of the database, such as DMUTILITY to mark the database as unavailable.
27. DATABASE EXTRACTIONS: Data that is read from a database.
28. DATABASE INTEGRITY TESTING: The process of testing the physical consistency of data files within a database.
29. DATABASE PROCESSING: Database processing in a mirrored disk environment.
30. DATABUFFER: A system memory buffer maintained by the DMSII software into which a data block is placed for ACCESSROUTINES access.
31. DATA SET: A disk file (potentially, a group of disk files) containing data records all in a similar format. An e-@ction Unisys Enterprise Database Server structure type declared in DASDL (Data And Structure Definition Language).
32. DATA WAREHOUSING: A copy of data specifically structured for querying and reporting.
33. DBA: DataBase Administrator. The person within an organization who is responsible for the development, maintenance, and security of databases.
34. DISASTER RECOVERY: The recovery of any event that had created an inability for an organization to provide critical business functions and data for some predetermined period of time. Generally, this involves reconstituting database files which were lost or unavailable.
35. DISK ROW: The minimum allocation of disk space via the MCP (Master Control Program). A disk file is composed of a sequence of disk rows that may occupy arbitrary locations on the disk media. Within a disk row, all blocks are allocated at sequential disk addresses.
36. DMSII: Unisys Data Management System II. The comprehensive, primary database management software package in use on Unisys A Series family of mainframe computers.
37. DM UTILITY COMMANDS: Commands used to manage a physical database.
38. EMC: A global enterprise storage company.
39. EMC SRDF: See SYMMETRIX REMOTE DATA FACILITY.
40. EMC TIMEFINDER: A business continuance solution which allows customers to use special devices that contain a copy of Symmetrix devices from an attached host(s) while the standard Symmetrix devices are on-line for regular I/O operation from their host(s).
41. FLUSHING TO DISK: The process of writing system memory buffers (data and/or audit) to disk.
42. FUTURE TRANSACTIONS SUSPENDED: The process of preventing database applications from entering a transaction state.
43. HMP: Heterogeneous Multi-Processor.
44. INTEGRATION TEST: The act of combining individual units and components, and then testing them to ensure that the individual units and components still function as expected.
45. LOGICALLY CONSISTENT DATABASE: An online database whose consistency is maintained by data buffers and physical data files.
46. MARC: Menu Assisted Resource Control. A menu-based interface to Unisys A Series systems for the purpose of entering system commands.
47. MCP/AS: Unisys Master Control Program/Advanced Systems. The comprehensive virtual memory operating system which drives the Unisys A Series family of hardware.
48. MCP ENTERPRISE SERVER REMOTE DATABASE: In an RDB (Remote Data Backup) system, the database copy that resides at the remote host.
49. MCP TO RDB DATABASE OPERATIONS CENTER GUI: The complete set of Remote Database Backup Operations (Configuration, Administrative, and monitoring) contained within the Database Operations Center graphical user interface.
50. MIRROR FAMILY: One or more physical disks that share a family name and contain mirrored images of all data from a source family of disks.
51. MIRRORED AUDIT TRANSFER: In an RDB (Remote Data Backup) system, a method of audit transfer where target audit data is available on a mirrored family of disks.
52. MIRRORED COPY: See MIRROR FAMILY.
53. MIRRORED DATA TRANSFER: A method of maintaining a mirrored family of disks containing data files.
54. MIRRORED DISK: A disk which is a mirror image of its source disk (e.g. Family Name, Serial number and capacity are identical).
55. MIRRORED SNAPSHOT: A mirrored copy of data that is split from its source data.
56. MONITORING OPTIONS: In an RDB system, user interface options that initiate the monitoring of audit generation and audit transfer activities.
57. OFFLINE DATABASE SYSTEM: A database system that is in a state of inactivity whereby no data files are being accessed from the database.
58. OFFLOAD PROCESSING: The process of dividing database access activities by creating one or more copies of a database.
59. ONLINE IN DATABASE SYSTEM: A database system that is in a state of activity whereby data files are being accessed from and/or modified to the database.
60. PDS: Product Definition System: The Unisys internal system containing ordering and configuration information for all Unisys products.
61. PHYSICALLY CONSISTENT DATABASE: A database whose consistency is established when no applications are in a transaction state and all data buffers are flushed to disk.
62. POINT-IN-TIME SNAPSHOT: A mirrored snapshot that is split at a specific point in time.
63. QUIESCE DATABASE: A database that is in a physically consistent state, i.e., all data buffers are flushed to disk.
64. QUIET POINT: Location in the Audit trail where no program is in transaction state.

65. RDB: Remote Database Backup. A Unisys product which provides real-time backup services for DMSII database as part of a disaster recovery plan. Remote Database Backup is suitable for use with A Series Databases.
66. REAL TIME REMOTE DATABASE ACCESS: Access to a remote database copy while the copy is kept current with its source database.
67. REGRESSION TEST: A representative subset of functionality tests to ensure stability and accuracy following the insertion or modification of code.
68. REMOTE COPY AUDIT: The activity of backing up a remote audit file that is a copy of its source.
69. SAN: Storage Area Network.
70. SAN MIRROR DISK MANAGER: A ClearPath system software feature that makes it possible to split off a copy of a disk family within the same MCP (Master Control Program) environment as the source volumes, regardless of the type of disk.
71. SCHEDULED BACKUP: A backup that is scheduled to be performed at a predetermined time.
72. SINGLE HOST BACKUP: A backup that occurs at the same host as its database source.
73. SNAPSHOT COPY: The term "snapshot copy" is used to identify a copy of an MCP (Master Control Program) family which has been provided unique identification. This allows the "snapshot copy" to coexist within the same MCP environment as its original.
74. SOURCE COPY: In a mirrored database environment, the initial database copy that is mirrored onto a target database.
75. SPLIT MIRRORS: Target mirrored disk copies that are split from their original (source).
76. SSR: System Software-Release. A package of system software and related documentation that is periodically released to the field for A Series computer systems.
77. STORE SAFE: A storage software feature that enables a site to ensure that multiple copies (mirrors) of disk data are coherent.
78. STORE SAFE MEMBER: A member of a mirrored set that has been assigned a store safe name.
79. SYMMETRIX: EMC corporation's enterprise storage system.
80. SYMMETRIX I: In an SRDF (Symmetrix Remote Data Facility) environment, the disk storage subsystem that represents the source (primary).
81. SYMMETRIX II: In an SRDF environment, the disk storage subsystem that represents the target (secondary).
82. SYMMETRIX REMOTE DATA FACILITY (SRDF): EMC's disk-mirroring software solution for use with Symmetrix hardware.
83. SYNC POINT: A quiet point (in the audit trail) that is forced to occur every "n" transactions; here Audit buffers are flushed.
84. TRACKER: An asynchronous RDB (Remote Database Backup) task declared and processed from Accessroutines. It's function is to rebuild the database.
85. TRANSACTION: A cycle which starts with a Read or a write operation and continuing until completion. Thus, Read data is accessed by the Requestor or the Write data is flushed to reside onto the database disk.
86. UCF: User Communication Form. A form used by a Unisys customer to report problems and express comments about Unisys products to support organizations.
87. VDBS: Visible DataBase Stack. A set of commands which are issued directly to a database stack (DBS FIG. 2) to interrogate or change some aspect of the database configuration.

Notes:
EMC=Trademark ™ of EMC Corp.
Symmetrix is a copyright of EMC.
SRDF=™ of EMC.
ClearPath=™ of Unisys.
Windows NT—Copyright of Microsoft.

General Overview:

The present invention involves a method of creating a physically consistent database from an on-line operating database system for the purpose of capturing a physically consistent mirrored snapshot of the on-line database system.

In normal practice, a logically consistent database is maintained for the "on-line" database system, by reading data from the physical disk storage and then temporarily storing the data in an active memory storage. During operations however, the data stored in memory can undergo many changes that are activated by the on-line database applications. However, these changes result in a database that is not physically consistent during the period while the database system still remains on-line and operative, since the data stored in memory 11M, FIG. 1, may not be consistent with data in Disk 12 (D1).

In general practice, the only method of securing a physically consistent database was to take the operating database system off-line in order to make a second copy of the database which would be consistent with the present state of the formerly on-line database.

It should be indicated that mirrored disk environments have been found to be very helpful in this situation. The physical consistency of a database is desirable by use of a mirrored-disk environment, whereby the mirrored copies can be split from their original source.

The mirrored copies then represent point-in-time snapshots of a physically consistent database, that is to say, that the mirrored copies are duplicative of the formerly on-line database, thus to form a physically consistent database situation.

The point-in-time snapshots can be used to off-load the processing operations away from the original database system enabling the original database system to be continually operative. Thus, by creating a physically consistent database (mirrored database) from an on-line database system, there is then no requirement or need to take the system off-line and deny service to various users. Thus, the database availability is continually useable and more efficient system operation is possible.

DESCRIPTION OF PREFERRED EMBODIMENT

The system environment in which the present invention operates is shown in FIG. 1. A primary site is seen to have a first server 10 which may be implemented with a Unisys ClearPath NX or LX server. Then at a secondary site or even a remote site, there could be a second server 20 which could also be implemented with a Unisys ClearPath NX or LX server.

Within server 10, there are a number of personal computers, 1, 2, and 3, which are connected to a first database system 11 and which provide certain applications for use by a user. Additionally in the first server 10, there resides a personal computer 4 which provides the Data Management Utility program (DMUTILITY).

The disk D1 is shown as item 12 and represents a family of physical data disks, while disk A1 represents a family of physical audit disks, each of which connect to the database system process 11, also often called Database Stack (DBS).

In the secondary server 20, there is seen to reside applications being utilized by personal computers 5, 6 and 7 which are connected to the Database Stack 22.

Interconnecting between the first and second server modules is a disk subsystem 15 which is seen to hold the disks 12 D1 and 14 A1 connected to the first server module 10 and further a disk D2,24 which connects to the database system 22 of the second server module 20. Interconnecting between the data disk D1,12 and the data disk D2,24 is a disk mirroring system 17 which provides for the remote mirroring of data. This type of mirroring system was described in U.S. Pat. No. 6,044,444 assigned to EMC Corp.

Thus, the first host computer 1 of the first server 10 can directly access a local data file 12 and an audit file 14. All changes and updates will be found to reside in the data files of 12 or the audit files of 14. However, any data written into the data file of disk 12 is automatically sent over the disk mirroring link 17 to a corresponding secondary volume disk 24, D2. Each remotely mirrored volume pair can operate in a selected synchronization mode including synchronous, semi-synchronous, adaptive copy-remote write pending, and adaptive copy-disk.

The primary, or first server 10 can operate with certain operations, such as (a) Read/Write, (b) Write Only; (c) Read Only; (d) DMUTILITY. These operate in conjunction with the database system 11.

In the disk subsystem 15, the disk D1,12 is a disk containing data files 12 which have been written to and read by the database system 11 of the first or primary server 10. The A1 disk is a disk containing audit files 14 written to and read by the database system 11 at the primary server 10. Within the disk subsystem 15 are several spare disks. The spare disk 51 is a spare disk available for the primary server 10 and is part of the secondary server 20. Likewise, the spare disk 52 is a spare disk available to the primary server 10 or the secondary server 20.

In the disk subsystem 15, the disk D2, containing disk files 24 operates as a physically mirrored copy of disk D1, containing disk files 12. Disk D2, containing files 24, is available for Read operations by the database system process 22 at the secondary server 20.

The secondary server 20 will be seen to carry a number of PC's 5, 6 and 7, with applications such that PC 5 is operative for Read only, PC 6 is Read only, and PC 7 is Read only.

The use of disk mirroring systems has been described in the prior U.S. Pat. No. 6,044,444 to Olek of EMC Corporation.

In FIG. 1, the disk files D1, containing files 12 and disk D2, containing files 24 also will be holding what is designated as a "Control File". Thus, both D1 and D2 will each have a Control File.

Figure 2:
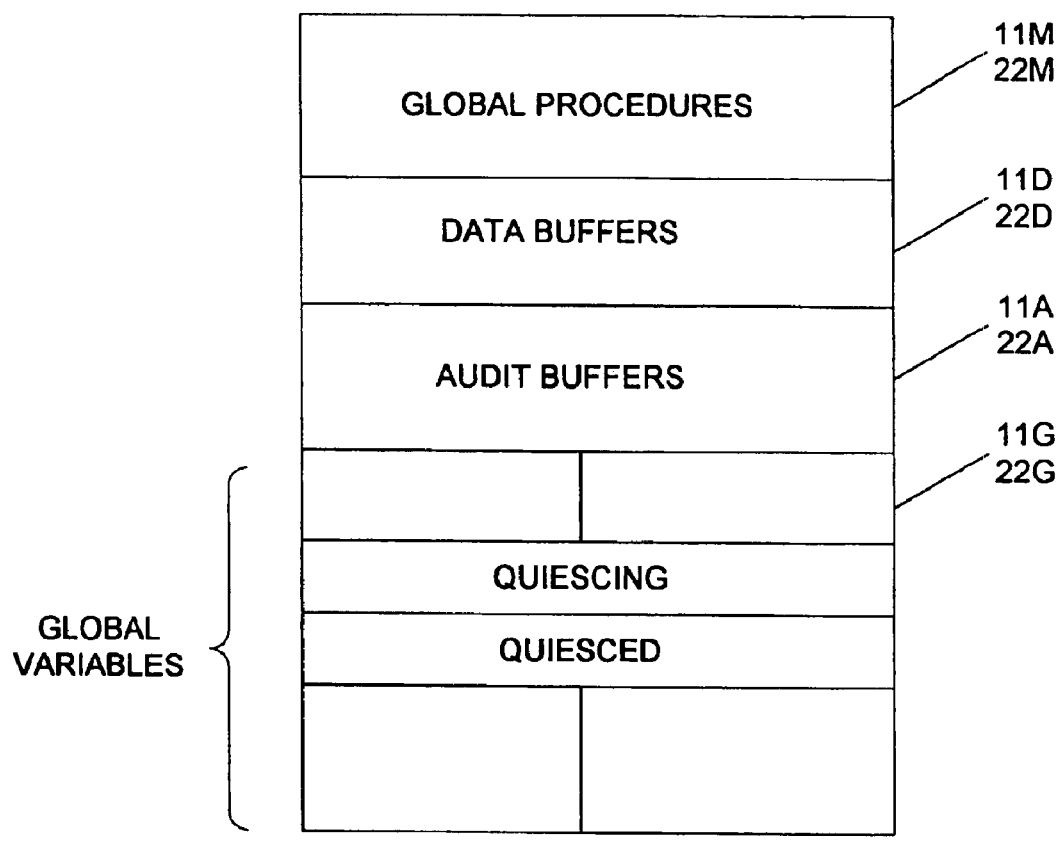
FIG. 2 is a schematic drawing showing the database system process and the types of information held therein.
Figure 3:
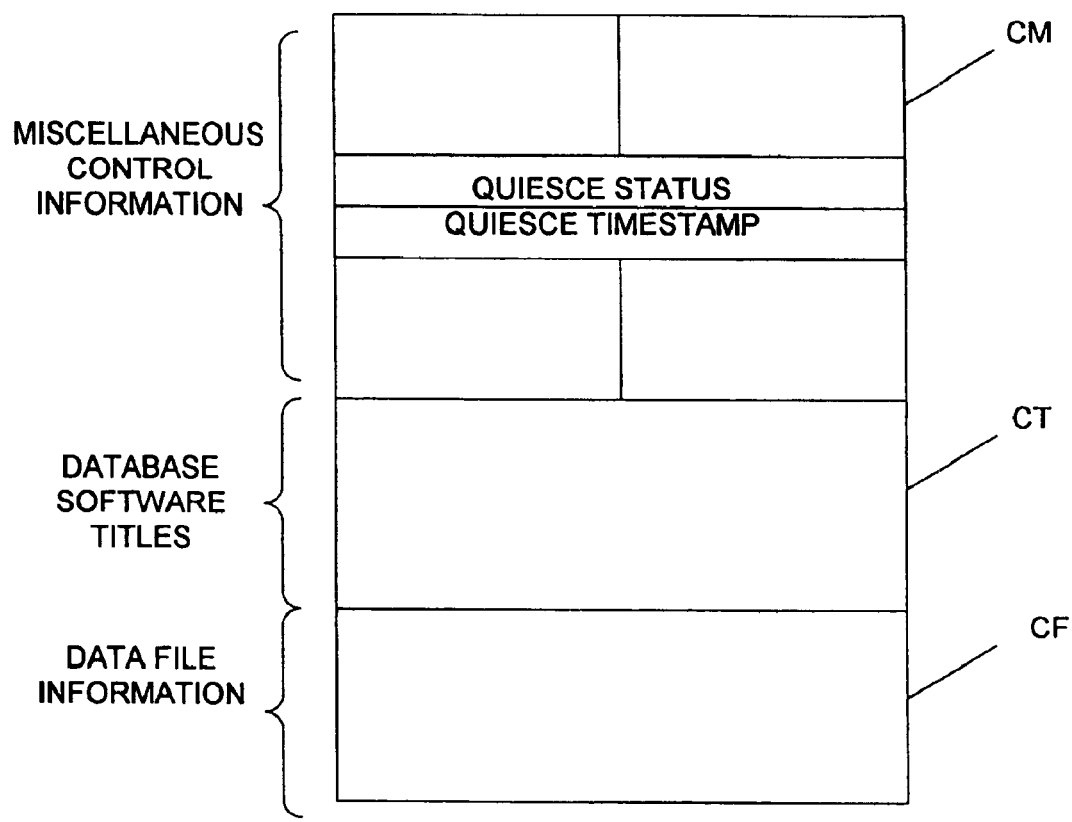
FIG. 3 is a schematic drawing of the database control file which resides in the disk database.

The first Database System Process 11 and the second Database System Process 22 are shown schematically in FIG. 2, while the Control File which resides in D1, containing files 12 and D2, containing files 24 is schematically shown in FIG. 3.

The Database Stack (also called Data Base System Process) is indicated in more detail in FIG. 2, which indicates the elements involved. Here, in FIG. 2, there is seen the section indicated as Global Procedures, which reside at 11M and 22M, as shown in FIG. 1.

Further in FIG. 2, the DataBuffer area is seen to constitute the memory data buffers portion 11D and 22D. Audit Buffers section of FIG. 2 will be seen to reside in the audit buffer portions 11a and 22A of FIG. 1.

Again referring to FIG. 2, there is seen a section designated as the Global Variables which involve flags for QUIESCING and flags for QUIESCED, These are further described in FIG. 3 as part of the Database Control File.

FIG. 3 is a schematic drawing of the Database Control File (which, as seen in FIG. 1 will reside in disk D1,12 and also in disk D2,24).

Thus, the Database Control File of FIG. 3 is provided for both the database D1 and the database D2, and is schematically shown to consist of the Data File Information area (CF) (Glossary item #26) and to also have an area for Database Software Titles (CT) and then another area for Miscellaneous Control Information (CM). This area involves the flags for the QUIESCE STATUS and for the QUIESCE TIME-STAMP.

Figure 4:
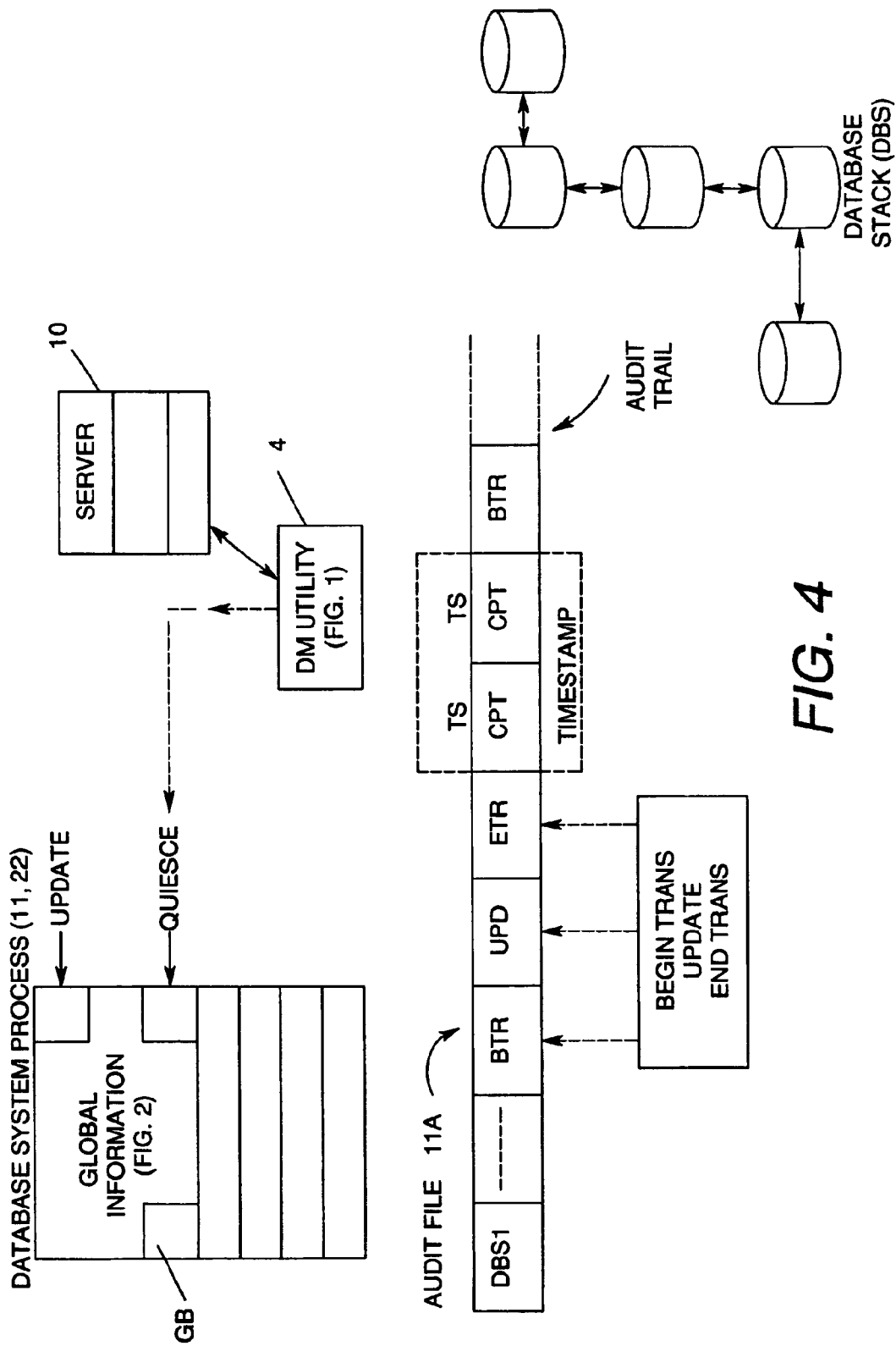
FIG. 4 is a schematic drawing showing the audit trail and sequence of transactions relating to the global information (of FIG. 2), the server and the database stack.

Referring to FIG. 4, there is shown a schematic illustration of the generalized set of operations which occur in the present invention. As seen in FIG. 4, there is shown a Database Stack (DBS1) which would correlate to the disk subsystem 15 of FIG. 1. The Database System Process (Database Stack) 11, 22, (FIG. 1) is shown in FIG. 4 with the Global Information Areas which were indicated in FIG. 2 as Global Procedures 11M, 22M. The Global Variables area 11G, 22G (FIG. 2), can receive a QUIESCE command from the DMUTILITY program 4 of FIG. 1, whereupon a flag would be set within FIG. 2 to indicate the state of QUIESCING and after completion would indicate the state of QUIESCED.

Likewise, when an update operation is to occur, then another flag is set in the Global Information area of FIG. 4 to institute an update operation by the auditing of two control points.

Further in FIG. 4, there is seen the audit trail taken from the audit file 11A, where there is indicated the series of sequential operations which can occur in the Database Stack indicated as DBS I. Then as shown in FIG. 4, there is a command for the Beginning of a transaction (BTR), then for the updating (UPD) of the disk D1,12 from the data buffer 11D (FIG. 1), and likewise the updating of the disk A1,14 from the audit buffer 11A (FIG. 1). At this point, there are two control points involved designated as CPT. Each of the control points has a time-stamp (TS) indicated for each of the control points after which there could be a following action of another sequence of Begin Transaction, Update Transaction, and End Transaction.

In earlier prior art implementations, in order to replicate data within the disk subsystems, there was always the transfer on communication lines through the network. Thus, network connection lines were required to transfer audit data from one system to another. With the presently described technology, there is no more need for inter-communication lines in a network, but rather the use of a mirrored system, such as indicated in FIG. 1 as the disk subsystem 15, together with the disk mirroring procedure 17.

The present system uses a DBS, or Database Stack, (FIG. 2) which is the Database System Process that enables the system to have many applications accessing data concurrently. It is possible to have 5,000 different applications accessing data, and in the present system there are provided buffers in memory, which can be accessed and then at the same time periodically (at certain control point periods) the data in the buffers are flushed back to the disk. Thus, the updates are already occurring within the database system, not necessarily always on disk, but, at certain points in time, it is guaranteed that all modified data is going to be written to disk.

After the flushing to disk occurs, it will be seen that one would then have a perfectly physically consistent copy, that is to say, that after the task of the beginning transaction, then updating and ending a transaction (as is indicated in FIG. 4), all the data in disk D1,12 and audit disk A1,14, will be in perfect consistency as between any data residing in the data disk D1,12. Likewise, there will be consistency as between the audit buffer 11A and the audit disk A1,14.

The present method now indicates a new mode of audit transfer in regard to eliminating any need for use of network interconnection lines, but rather includes the use of a mirrored audit system, such as the disk mirroring 17 of FIG. 1. Part of the features applicable to the present situation involve background with earlier times when storage, such as disk storage, was very expensive. However, with evolving technology, storage, such as disk storage, is much less expensive and is easily applicable to use for replicating data within the disk subsystem.

In the presently described system, it is possible to have, for example, 5,000 different applications accessing all the data. At the same time there are multiple buffers kept in memory FIG. 2 in order to hold modified data, thus, sometimes there can be an inconsistency as to the data residing in buffers and the data on disk, and there is thus an inconsistency. However, after flushing the buffers (11A, 111D; 22A, 22D), then there would occur a snapshot consistency as between the buffers and the disk database.

There are often many applications that are making changes to the database at all times, and these changes will appear first in the data buffers and in the audit buffers.

As an example, suppose new information occurs to say that employee "J" has moved and his address has changed. Thus, the application involved goes to make a change to employee "J's" address. However, the application first must need to go get his current record which would contain "J's" name, his social security number and other pertinent information. So, now the changed data will have a new address, but this is not immediately written right back to the disk and may reside in the buffer for some period of time.

However, then at certain points in time, the system would take the audit buffers (actually, when the audit buffers got filled) and then instantly write that updated information to disk, even though the data in the data buffer had not yet been audited, that is to say, the audit disk A1,14, and employee "J's" new address, may not still be placed on the disk A1 when a power failure occurred. There would then be a physical inconsistency on the disk A1, since the new address was not written to disk before the power failure. Then, when an application comes in and asks the query of "what is employee J's address there could be an inaccurate address for "J".

However, it should be noted that each time the updated information from the buffers is flushed out to disk, the disk mirroring system 17 will ensure that a mirrored copy will then occur on disk D2,24.

However, in order to make this copy to the primary disk and the mirrored disk, it is necessary to ask the question—what does it take to create this physical copy without stopping access activity of all the users who are operating with the system. The answer to this is the use of the new QUIESCE command.

So, here, while there may be thousands of applications running at the moment, however, the DMUTILITY program 4, FIG. 1, will enter the QUIESCE command which then works to provide the activity of creating a physical point of consistency. During the process of QUIESCING, this means that all the users need to stop their operations temporarily, so that everything can be written to disk. It is this point where the use of the Control File in disk D1,12 comes into use. Likewise, the Control File of disk D2,24 also comes into use, since it operates as a mirrored image of D1. Thus, as is seen in FIG. 3 which indicated the Database Control File, then under Miscellaneous Control Information there was shown the "QUIESCE status" and also the "QUIESCE TIME-STAMP". The TIME-STAMP indicates what flushing operations have been completed at that point in time and later permits the system to find that particular time point and institute later flushing of modified data.

Using Global Information provided in FIG. 2 and FIG. 4, is useful so that if a user is operating, there might be set a flag bit of 1, (GB) but when a user has gone away and is not using this system, the flag bit can be set to "0". This bit location in FIG. 4 is indicated at GB. However, the "1" bit at GB would be useful to indicate that a given user was cut-off (during a power failure) from an activity that influenced the data buffer and must later be remedied for inconsistency.

When a power failure occurs, the system has been set-up by the user to determine at what particular points of time (Control Point) that a few milliseconds of time will be used for QUIESCE in order to flush buffers to disk and regain consistency and after that, this will work automatically. This is where the use of the Control Point comes in, as indicated in FIG. 4. A Control Point basically means "flush", that is to say, write your data to the disk and update the audit file, and during the "Control Point flush", there would be an automatic writing to the mirrored disk so that the mirrored disk would automatically get updated and thus, disk D1 and D2 are always consistent with each other, whatever they hold. However, there is still the possibility of data in buffers which are not consistent with data in disk.

The Control Point and TIME-STAMP operate to later fix this situation. At this point, there is a need to allow some time to what is called "cutting (splitting) the mirror" in order to disconnect disk D2 from disk D1, so as to provide a snapshot at D2 as of the time point of the QUIESCE command.

For example, it may be the end of the month and an operator wants to get a snapshot, so at that point the DMUTILITY would enter the QUIESCE command, and this would provide a very good physically consistent snapshot for the point in time of the TIME-STAMP.

The whole purpose here is to create a copy, at D2 and then remove it from its link to D1.

The purpose of breaking the mirror is (often called that of "splitting". This splitting has the whole purpose to stop any further updating from occurring. This is done because thus, there is now a snapshot of information in disk D2, at whatever point in time that QUIESCE command was entered. It may be noted that the spare disks 51 and 52 could also be mirrored to D1 to get extra database copies.

As an example, suppose there were 1,000 users using the system and a good portion, say 500, of requests that were not time-critical. Thus, if it were determined that only say, 500 users were really "mission critical" then by creating the snapshot, the operator could off-load the non-critical users and leave ongoing operations to the critical users, and thus could improve availability and performance.

As discussed earlier in connection with FIG. 1, some of the applications such as (a) and (b) are currently Read/Write or Write only operations, which involves situations such as employee "J" going in and changing his address and doing a Write operation. Applications such as (c) Read Only can go on without interruption, since the QUIESCE command only applies to (a) and (b) for Read/Write operations or Write only.

So, under these conditions, the system is set-up to do the operations of flushing, but it is not going to wait for the preset automated system which was originally set to 1,000 transactions before the flushing could occur. At this point, there is use made of the created two Control Points, so that one Control Point will only flush half of the data, that is to say, 500 transactions, and later the other Control Point will flush the other 500 transactions. As a result, it would take the audit trail, as seen in FIG. 4, which will be indicating the two different Control Points. The user and his application has a special code that indicates the "Begin Transaction" and then indicates "Updating activity" and then indicates the "End Transaction", as was seen in FIG. 4.

Once an application says to "Begin Transaction", and then does an updated change on employee "J's" record, no one would be able to access employee "J's" record. But finally, once the system counts 1,000 transactions and then decides that it is going to do the flush operation, and when the flush is done, there will be an entry in the audit record called the "Control Point" so that it is now known that the "complete flush" has occurred. In the case of a power failure, the system will start reading the audit trail according to the TIME-STAMP and the Control Point involved.

From this it is now known from the TIME-STAMP, that this is the last time you did a flush, and then it is necessary to back to one more Control Point and TIME-STAMP because it is then known that everybody was "flushed", and that was the point of consistency.

If another power failure occurred, then when there was a re-start of the database after the power failure, it would be necessary to go right to the audit trail and look in a Control File to find those users who had a "1" flag (GB), that is to say, those users were using the database and it defaulted due to the power failure. Then the system goes back to the audit trail to the two Control Points, and reverses everything out of the data to get to the point of physical consistency, and where it stopped letting any users do accesses.

The idea of physical consistency basically applies to one server, that is to say, the consistency between the Write memory and the disk, thus, the server 10 and its computer, operates to update the disk D1, but it also maintains data in buffer memory at all times which may not always be consistent with the same data in the disk, D1. It should be indicated that the disk D1 may be inconsistent, since data in the buffers may not have yet been flushed to the disk to update the disk with the new data.

During the time of the QUIESCE operation and the setting of the QUIESCE bit, as in FIG. 4, the applications and users are inhibited from doing Read and Write operations and accessing the database. After the RESUME command from DMUTILITY, then all the various users and applications can start moving again normally in their transactions, but this is only after the QUIESCE bit is turned-off. It is when the QUIESCE bit is on that no one can update the database. However, those applications which involve only a Read operation (Applications 5, 6, 7, FIG. 1) can go ahead and operate, even though the system is in a state of QUIESCE.

Another useful feature here is the operation of completing a backup of the database. Thus, even while the system is running, it is possible to backup the database and it is not necessary to shut-off and put the system off-line in order to do a backup since the mirrored disks are available and the backup can occur from the mirrored disk. It would still be necessary to use a backup database disk, since one can recreate the database.

It should be noted that within an audit file all the data is within an audit block, and each audit block is enumerated with audit block serial numbers which was discussed in Unisys U.S. Ser. No. 09/415,273 especially in FIG. 6 of that case. These audit blocks are indicated in the audit buffers shown in FIG. 1 at 11A, 22A of the present disclosure.

It should also be noted that in the state of QUIESCE, there is still the possibility of Read-only applications to occur, but then when a RESUME command is used, the entire activity (Read/Write) of all the users in the system would be operable.

The audit block is significant because every audit block that contains a group of records is equivalent to one of the audit buffers in memory, as indicated in FIG. 1. When the audit buffers get filled, then automatically the system will say "go flush the data to the audit disk", and now these buffers are available for new data usage.

Figure 5:
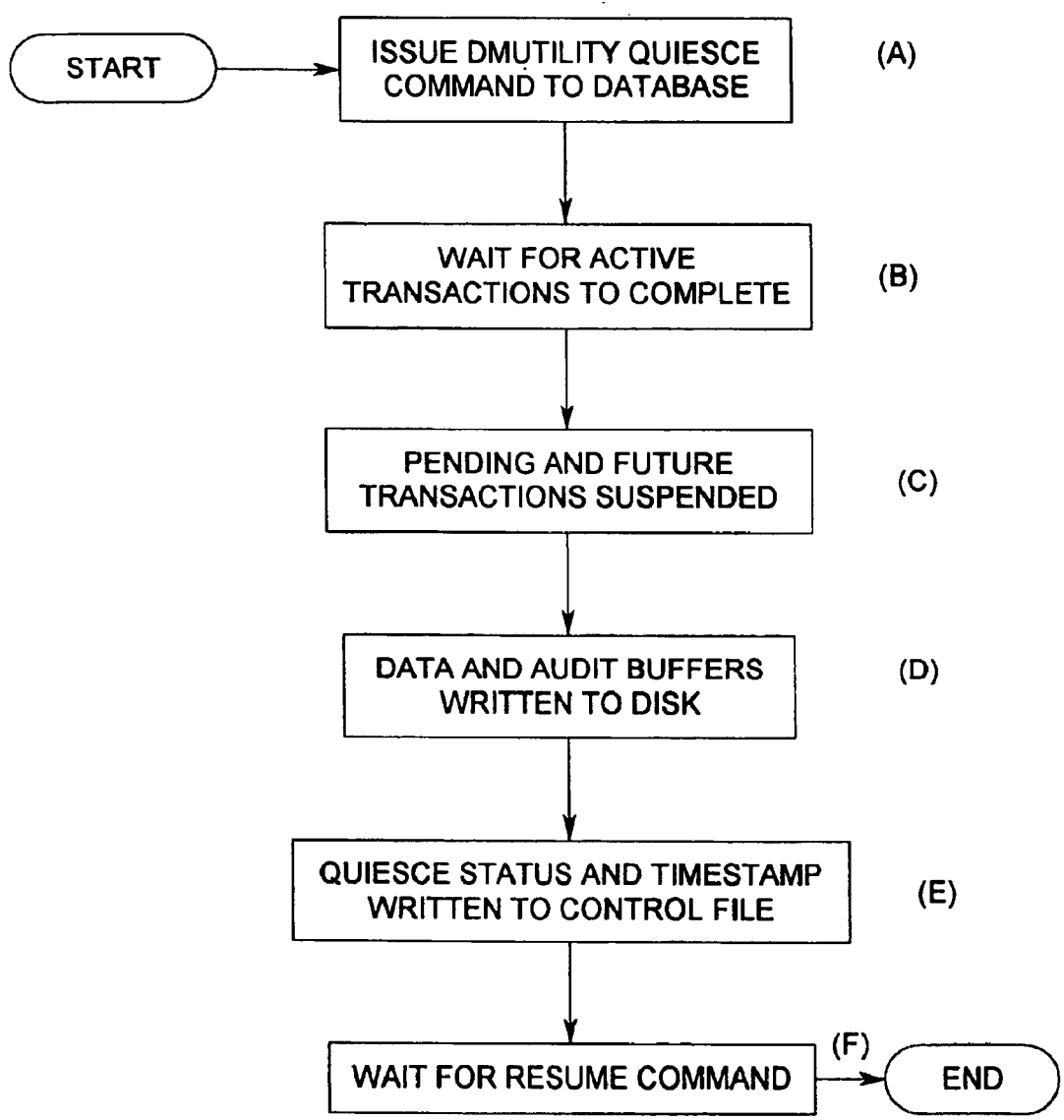
FIG. 5 is a flowchart showing the steps involved to initiate the QUIESCE command, write the data and audit buffers to disk and eventually to resume normal operations.

Referring to FIG. 5, there is seen a flowchart of the steps involved in the utilization of the present invention.

Consider the entire server system and database is running for a period of time and servicing multiple applications and users and everything is continuously being mirrored through the use of the disk subsystem 15. At that point, at step A, there is an entry of the QUIESCE command which is derived from the PC 4, which provides the DMUTILITY program command. Here then, there is a QUIESCE operation to the database which means that there will be no writing to the database D1, even though it is possible for certain applications to access data (Read) from the database D1. These would only be Read operations. At this point, as was indicated in FIG. 2, QUIESCING occurs to allow ongoing transaction to complete after which the state of QUIESCE stops all further flushing of buffer to disk. Thus, the database is QUIESCED and not being used, and the system is waiting for the RESUME command before continued operations can occur with regard to the database D1. At this time, this is a safe period to split the mirrors, that is to say, this tells the disk subsystem to stop any further mirroring operation, as there is a breaking-up of the mirroring system at that moment.

For example, when there is an entry of the DMUTILITY command, and PC1 and PC2 have applications which involve Read/Write operations, which are right in the middle of their transactions, thus, when the entry of the QUIESCE command occurred and the applications were in the middle of updating a given address, these are allowed to be completed (QUIESCING) and any other applications which were ongoing would have to be allowed to complete.

Then at step B, when every one of the users and applications have completed their transactions, at that point (QUIESCE) there will be a suspension step C, of all future transactions during at which time the system will write at step D, all the data from the buffers to disk, that is to say, everything is flushed, so now the disk D1 and disk A1 have been updated. At step E, there is a creation of the Control Points in the audit trail, at which time there is an updating of the Control File and the initiator of the TIME-STAMP and the state of the QUIESCE command in the Control File. The TIME-STAMP is useful since, if a catastrophe occurs which causes the loss of the database, then it is necessary to use the backup system, and this is where the TIME-STAMP comes in to use, since there is a physically consistent snapshot at a known time of the database which can be used as a backup.

Thus, at step C, the pending and future transactions are suspended during the QUIESCE operation. These are shown in steps B and C of the flowchart. Then at step D, the data and audit buffers are now written to disk D1.

At step E, the QUIESCE status and the TIME-STAMP are written to the Control File, as was indicated in FIG. 2 and FIG. 3.

At step F, there is a waiting period for the RESUME command to occur. During this time, of course, the mirrors are split, at which time one can enter the RESUME command and continue normal system operations.

At this time, the operators have the use of the mirrored copy which is a snapshot of some physical time point of the database. The split in the mirrored system is required before the RESUME command because if one did not do the split, then once one did the RESUME command, the system would start updating the mirror disk again.

After the split is done, it is a matter of choice whether to use the mirroring effect to continue to update the secondary disk D2. There can be used a family of disks for example, 48 physical disks which provides a situation towards storage management, as opposed to server management, so it is possible to have many disks available to do many different things, such as establishing new mirrored disks in addition to the first two. These mirrors can be provided onto the spare disks, such as 51 and 52, and these disks can be used for physical snapshots without any interference to the overall operations of the server system.

Thus, the present system can provide a consistent copy of data at any particularly given point in time, while at the same time allowing the various applications to be running on the system.

Described herein has been a specialized system in database management in which a snapshot of physical consistency can be provided at certain points in time to a mirrored database, while still permitting multiple applications to be running, but which also provide a momentary stoppage period using a "QUIESCE" command during which flushing of data buffers and audit buffers to a disk data buffer and disk audit buffer can occur to allow the database disks to be updated.

While one embodiment of the described system and method has been illustrated, it should be understood that the invention may be implemented in other embodiment as defined in the attached claims.

What is claimed is:

1. A method for developing a physically consistent snapshot at a secondary database of a primary database comprising the steps of:
   (a) periodically flushing buffer memories having modified data onto said primary database, and including the step of:
      (a1) initiating a DMUTILITY program command (QUIESCE) for managing transfer of modified data to a primary database on a primary disk (D1);
   (b) establishing a physically consistent body of data in said primary database which is consistent with said buffered memories at a selected point in time, without denying use of said database to multiple users of read-only transactions, and including the steps of:
      (b1) momentarily postponing requests from user-applications (QUIESCING) until all ongoing transactions are completed after said initiation of said DMUTILITY program, and including the steps of:
         (b1a) flushing, at a selected point in time, of all modified buffers to said primary database (QUIESCED);
         (b1b) holding off all user requests momentarily until all modified data buffers, at said selected point in time, are flushed onto said primary database;
   (c) mirroring, at said selected point in time, all data on said primary database onto a secondary database;
   (d) splitting off said secondary database from said primary database to provide a snapshot-in-time, of said primary database, at the location of said secondary database.

2. A system for developing a physically consistent database at a secondary database at a given point in time, said physically consistent secondary database derived from a primary pool of data buffers and audit buffers at a primary database means comprising:
   (a) multiple user applications connected to a database having a system memory means;
   (b) said primary database means for servicing multiple user applications and interfacing a primary database disk means;
   (c) said system memory means providing a primary pool of buffer memory units for holding modified data and for holding audit data;
   (d) said primary database means including:
      (d1) means for holding updated data on a first data disk;
      (d2) means for holding audit data on an audit disk;
      (d3) means for holding accumulated data on said first data disk;
   (e) means for momentarily stopping access to said primary database means until all modified buffer memory units have been flushed to said primary database means to provide a physically consistent set of data on said primary database means at a given point in time, said given point in time being determined by a Database Control Point File means which includes:
      (ei) means to initiate a QUIESCE command operation to flush all modified buffer data units to said primary database means;
   (f) means to mirror the data of said primary database disk means onto a secondary database disk means during a QUIESCE operation to provide a physically consistent snapshot at said secondary database disk means, of the data from said primary database disk means;
   (g) means to split off said secondary database disk means form said primary database disk means after completion of said QUIESCE command.

3. A method for developing a physically consistent snapshot at a secondary database of a primary database, comprising the steps of:
   (a) initiating a DUMUTILITY QUIESCE command;
   (b) allowing the completion of active transactions to said primary database; suspending subsequent pending transactions;
   (c) permitting the continuance of applications performing non-transactional read-only operations which are unaffected by said QUIESCE command;
   (d) writing, from said primary database system memory to disk D1, all updated data buffers (11D) when all active transactions are completed;
   (e) duplicating said primary database (D1) to obtain a physically consistent snapshot copy (D2).

* * * * *